Patented Apr. 15, 1952

2,592,523

UNITED STATES PATENT OFFICE 2,592,523

REMOVAL OF HYDROGEN SULFIDE AND MERCAPTANS FROM GASES OR LIQUIDS SUCH AS PETROLEUM OR PETROLEUM FRACTIONS

George W. Ayers, Chicago, Marcellus J. Geerts, Evanston, and William A. Krewer, Skokie, Ill., assignors to The Pure Oil Company, Chicago, Ill., a corporation of Ohio No Drawing. Application August 21, 1948,
Serial No. 45,584

10 Claims. (Cl. 196—24)

This invention relates to a method for removing acidic materials, such as mercaptans and hydrogen sulfide, from gas mixtures, petroleum fractions and the like and to a composition of matter useful in the process. In particular, the composition of matter comprises a resinous material having a prepared active surface of amine groups which make it reactive with hydrogen sulfide and mercaptans in an easily reversible reaction.

In the conduct of many of the normal operations in the refining of crude petroleum, sulfur in the form of hydrogen sulfide and mercaptans creates complications which necessitate extra steps to make possible the smooth operation of processes employing recovered hydrocarbons. Thus, recovery of various light gases from crude oil involves their separation from hydrogen sulfide in order that the purified hydrocarbon gas can be sold. Commercial requirements for various hydrocarbon fuels, such as normal fuel oils, kerosenes and gasolines, call for the preparation of sweet products. Similarly, when hydrocarbons are to be used in various organic chemical reactions and syntheses, it is preferred that the hydrocarbon be substantially free of sulfur, because the reaction conditions to which the hydrocarbon may be subjected are such that undesirable contaminants can appear in the product. Also, because sulfur has considerable value as such, its separation is accomplished wherever possible or economically feasible.

Accordingly, it is a fundamental object of this invention to provide a process by means of which sulfur in the form of hydrogen sulfide or mercaptans, as they occur with oil can be conveniently recovered directly from the petroleum and fractions thereof.

It is a second object of the invention to provide a composition of matter which can enter into reversible reaction with the compounds of sulfur to be recovered.

It is a further object of the invention to provide a method and composition of matter by means of which sweetening operations can be simplified.

It is a still further object of the invention to provide a composition by means of which selected sulfur components of hydrocarbon fractions can be removed therefrom.

This invention, accordingly, comprises a method of carrying out a purification of certain gaseous and liquid fractions, and includes a composition of matter useful in the process.

More specifically, the composition constituting one phase of the instant invention comprises a resin of any one of several types, such as polymethyl methacrylates, polyvinyl chlorides, polyvinyl acetates, polyvinylidene chlorides, polymers formed from materials containing one or more allyl groups, or alkyd type resins, which has been modified by reaction with an organic alkanolamine or other organic nitrogen compound, so that the surface of the modified resin presents amine groups or substituted amine groups properly oriented in relation to the surface for reaction with any compound or compounds exposed thereto. When the composition is thus prepared and has an active surface of amine groups or substituted amine groups, it can enter into reversible reaction with hydrogen sulfide and mercaptans and thereby form the basis of a process for separating hydrogen sulfide and mercaptans from admixture with other gases and liquids not reactive with the modified resin.

When a modified resin is prepared in accordance with the invention and has an active surface of primary, secondary or tertiary amine groups, a gas or liquid, such as petroleum or petroleum fractions, containing hydrogen sulfide or mercaptan is passed through a tower or condenser packed with this resinous absorbent in granular form. The active surface of the exposed resin which presents primary, secondary or tertiary amine groups, preferably of the aliphatic type, to the gases and petroleum fractions flowing thereover, reacts with the hydrogen sulfide and mercaptans contained therein to permit only the hydrocarbon to escape from the vessel. When the resin has become saturated with hydrogen sulfide and mercaptan, it can be regenerated by heating to reverse the reaction between the hydrogen sulfide and the amine groups. This salt of hydrogen sulfide or mercaptan formed on the surface of the absorbent can be decomposed and the absorbent regenerated either by washing the spent absorbent and exposing it to a current of steam or inert gas, or simply by heating the salt and distilling off the hydrogen sulfide or mercaptan. The advantage of the process should be apparent from the fact that it is not necessary to remove the resin from the tower for regeneration and, because the reaction is substantially quantitatively reversible, the material may be regenerated repeatedly.

The preparation of suitable absorbents for the process may be carried out by reacting a resin containing an active group with an ethanolamine or other suitable amines.

If the resin molecule is looked upon as a chain in which functional groups occur at intervals, the alkanolamine or other suitable amines used to react therewith can be fastened to the resin surface through reaction of the hydroxyl portion of the molecule to leave the amine portion free for reaction, yet hold to the surface through the functional portion of the resin molecule. The alkyl portion of the amine molecule may be a chain of any length. Amine groups carried by chains of as many as 25 carbon atoms are satisfactory. It is preferred that the amine group added to the resin be attached to the functional portion of the resin molecule through at least about 1 or 2 carbon atoms so that it will be substantially uninfluenced by the resin molecule. Also, the resin molecule should be sufficiently cross-linked to avoid thermoplasticity of the composition. There are several methods of preparing suitable absorbents for use in the process which can be described as follows:

*Method 1.*—Preparation by the Transesterification Reaction. An acrylic resin, such as polymethyl methacrylate or polymethyl acrylate in granular or powdered condition, for example a commercial powder, is heated with diethanolamine with or without added catalyst to a temperature sufficiently high to cause methyl alcohol to distill from the reaction mixture, thereby causing a resin containing secondary amine groups to be formed. After an amount of methyl alcohol representing substantially complete reaction of the alkanolamine therewith has been distilled over, the residual modified resin is permitted to cool and is reduced to granular form by grinding. This material is then used as an absorbent in a tower for purifying petroleum fractions. A reaction representing the formation of the modified resin can be represented as follows:

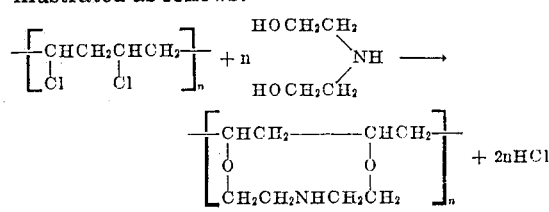

This material is polymeric in nature and has exposed active secondary amine groups separated from the original molecule by chains of two carbon atoms, which modified resin will enter into reversible reaction with hydrogen sulfide to form a salt. The reaction is readily reversible thereby permitting regeneration of the modified resin and its re-use in an absorption reaction.

Though the product has been shown as having the diethanolamine connecting two ester groups, it could be linked to two separate molecules of the resin, or it could be attached to a molecule at only one end.

*Method 2.*—Preparation of the Modified Resin by a Reaction of the Williamson Type. If a resin containing an active halogen, such as polyvinyl chloride, polyvinyl chloride acetate or vinylidene chloride is to be used as the basis for the reaction, it can be reacted with the alkanolamine in aqueous or alcoholic solution thereof and sodium hydroxide. The mixture is warmed in order to complete the reaction. Finally, the resin is washed with water to reduce the inorganic chloride content, dried, reduced to granular form and used as an absorbent in a tower for purification of petroleum fractions. The reaction representing the formation of the resin is illustrated as follows:

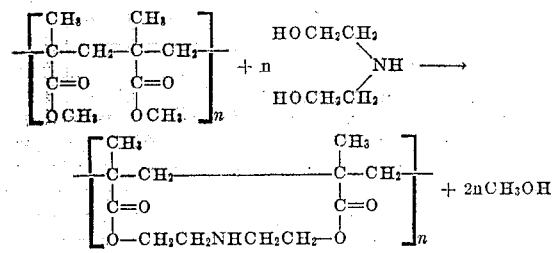

The modified resin could also be formed by reacting the material with sodium cyanide to form the nitrile and then reducing the latter to the amine.

The product, it will be observed, is polymeric in nature and has an active surface of secondary amine groups exposed for reaction with hydrogen sulfide and mercaptans. This surface will enter into reversible reaction with hydrogen sulfide to form a salt. Thus, it will be seen that by packing an absorption tower with a modified resin of the type described, a process for the separation of hydrogen sulfide and mercaptans from petroleum fractions and various gases can readily be devised. Though the product has been shown as having the diethanolamine connected through two ether groups, it could be linked to two separate molecules of the resin, or it could be attached to a molecule at only one end.

*Method 3.*—Preparation of the Modified Resin from Alkyd Type Starting Materials. Any amine containing 2 or more hydroxy groups, such as diethanolamine, is heated with an organic acid containing two or more carboxyl groups. The material will polymerize and finally will be viscous after considerable water has been eliminated in the reaction. Finally, when the polymerization has been carried out to a reasonable extent, the resin is recovered, reduced to granular or powdered form, after which it is washed with water, then with excess sodium hydroxide and finally with water to remove excess sodium hydroxide.

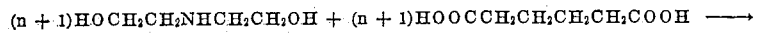
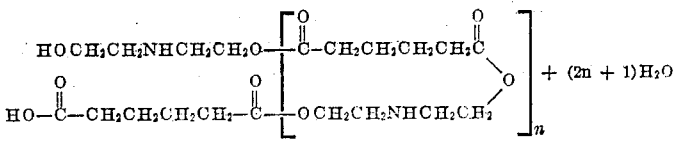

*Method 4.*—Essentially in the manner described in Method 2, polyvinyl alcohol can be reacted with chloracetic acid to give a resin containing carboxyl groups which are converted into acid chloride groups and the acid chloride groups in turn can be converted into amide groups which on reduction give the desired surface-modified product.

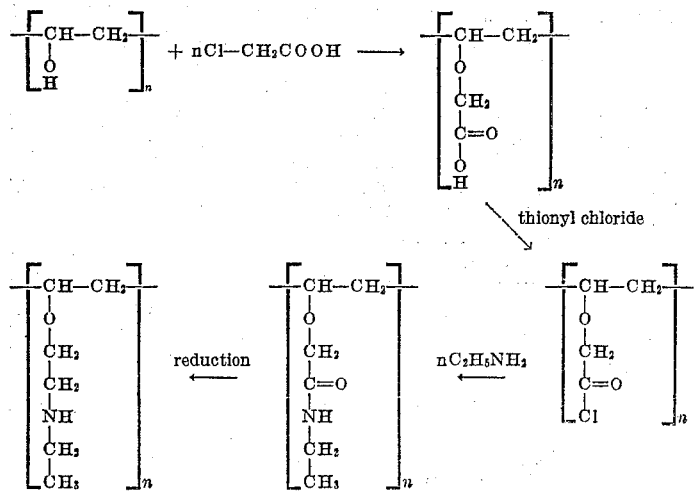

It will be seen that the product formed in this reaction is polymeric in nature and will have a surface of exposed secondary amine groups available for reaction with hydrogen sulfide and mercaptans.

This reaction is reversable by means of which it is seen that the modified resin is readily recovered.

The preceding set of examples serves to illustrate that the type of modified resin contemplated for preparation in accordance with the invention is one which has amine groups attached to the functional group of the resin molecule through alkoxy chains. It is preferred that the chain be at least about one or two carbon atoms in length, because attachment of the amine directly to the resin molecule may cause it to lose some of its character as an amine and also to modify the properties of the resin. The attachment of the amine to the resin molecule through longer chains is feasible and desirable, for in such cases the basic character of the amine group is preserved. It is most convenient in preparing the modified resin to use compounds such as alkanolamines for the reaction, because they have the amine group already attached to an alkyl group and, additionally, carry a hydroxy group which is available for reaction with the resin molecule. Thus, common alkanolamines, such as mono-, di-, and triethanol and mono-, di-, and triisopropanol amines can be used for reaction with the resin. It is not necessary that the amine be symmetrical, for mixed alkanolamines containing alkyl groups having different numbers of carbon atoms, such as ethanol-isopropanol and ethanol-n-butanol amine can also be used. Similarly, halo-alkylamines, such as 2-chloroethyl amine and 4-bromo-butyl amine, which contain one halogen atom in the alkyl group which is reactable with the resin, can be used to attach an amine group to the resin molecule. Cyanides, as pointed out, can be used for reaction with certain resins to form nitriles, which, in turn, can be reduced to the appropriate amines. Direct reaction of a nitrile with the resin to attach a nitrile group thereto can be practiced and the compound subsequently reduced to the amine.

It is apparent from the above examples and description, that the type of compound to be used for the absorption of the acidic materials from hydrocarbons and hydrocarbon mixtures is that which has the amine group oriented outwardly from the resin molecule.

When modified resins of the types described are prepared, solid compounds result which can be conveniently used for the treatment of hydrocarbon materials. The problem raised by the employment of aqueous solutions for removing mercaptans and acidic materials from hydrocarbons is readily solved, because the equilibrium problems created by the use of aqueous solutions do not arise. In the use of any aqueous solution for removing acidic materials from hydrocarbons, this equilibrium problem is of considerable moment, for, more often than not, the equilibrium runs against the removal of the acidic and sulfur-containing compounds. In the instant case where a solid compound is used for reaction with the acidic materials, it can be recovered by treatment with water or aqueous alkali solutions to hydrolyze off the absorbed material.

When it is desired to prepare a modified resin product suitable for separation of hydrogen sulfide from petroleum liquids and gases, it is best to prepare a modified resin which will have a surface of secondary amine groups. The principal reasons for so doing are that the resin is a solid and it forms a salt with hydrogen sulfide which is a solid. Secondary amine groups are, in general, somewhat more basic than either primary or tertiary amine groups. When it is in this solid form, it is easily possible to recover the hydrogen sulfide with a caustic wash, by steaming it or by passing a hot gas through it.

The method of removing hydrogen sulfide and mercaptans from petroleum fractions follows readily from the above description. A resin having its surface properly modified with amine groups is reduced to granular form and employed in a tower as packing. The fluid, for example, a petroleum fraction, it is desired to strip of acidic constituents, such as hydrogen sulfide or mercaptan, is passed through the tower at ambient temperature at a rate which will permit sufficient residence time to bring about substantially complete reaction of the acidic constituent with the resin. Because the reaction of the modified resin with acidic materials begins to reverse at about 100° C., it is best to operate stripping steps at about ambient temperatures and recover the resin at temperatures above 100° C. Upon exhaustion of the absorptive power of the resin, it is regenerated by washing with an alkali solution, about 10 to 20 per cent aqueous sodium hydroxide, if it is desired to recover the acidic constituents as a salt. Sometimes it is desired to recover hydrogen sulfide and mercaptan as such from a petroleum fraction, in which case the exhausted resin is steamed while held at a temperature of about 100° to 300° C. Hydrogen sulfide and mercaptan are readily recovered by reversal of the addition reaction.

The general reaction for the formation of the salt of the modified resin with hydrogen sulfide or mercaptan may be represented as follows:

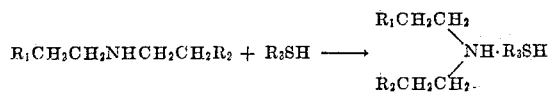

In the equation $R_1$ and $R_2$ may be any of the classes of radicals indicated in the several methods of preparation outlined; $R_3$ may be any alkyl, aryl, aralkyl radical or hydrogen so that the formula represents any sulfhydryl compound.

Though the preparation of the modified resin and the method of recovering hydrogen sulfide and mercaptan from petroleum fractions have been described with only a few examples, the principles governing the preparation and the process are clear and the examples are to be considered simply as illustrative thereof.

What is claimed is:

1. The method of recovering weakly acidic sulfur compounds from hydrocarbons and hydrocarbon fractions which comprises, contacting the hydrocarbon with a modified resin which is the reaction product of a resin and an amine, and has the amine groups attached to the resin molecules through alkoxy chains, and recovering the acidic sulfur compounds from the modified resin.

2. The method in accordance with claim 1 in which the weakly acidic sulfur compound is hydrogen sulfide and it is recovered from the modified resin by washing with an alkali solution.

3. The method in accordance with claim 1 in which the weakly acidic sulfur compound is hydrogen sulfide and it is recovered from the modified resin by heating the spent modified resin to an elevated temperature to decompose the compound it forms with hydrogen sulfide.

4. The method in accordance with claim 1 in which the weakly acidic sulfur compound is mercaptan and is recovered from the modified resin by heating the spent modified resin to an elevated temperature to decompose the compound thereof with the mercaptan.

5. The method in accordance with claim 1 in which the weakly acidic sulfur compound is mercaptan and is recovered from the modified resin by washing with an alkali solution.

6. The method of separating hydrogen sulfide from petroleum and petroleum fractions which comprises, contacting the petroleum with a solid modified resin which is the reaction product of a resin, and an amine, so that it has a secondary amine group attached to its surface through an alkoxy chain.

7. The method of separating hydrogen sulfide from petroleum and petroleum fractions which comprises, contacting the petroleum with a solid modified resin which is the reaction product of a resin selected from the group consisting of methacrylates, vinyl chlorides and acetates, vinylidene chlorides and acetates, alkyd resins, and an amine, so that the product has secondary amine groups attached to its surface through alkoxy chains.

8. The method in accordance with claim 7 in which the absorbent modified resin is the reaction product of polymethyl methacrylate and a secondary alkanolamine.

9. The method in accordance with claim 7 in which the absorbent modified resin is the reaction product of polyvinyl chloride and a secondary alkanolamine.

10. The method in accordance with claim 7 in which the absorbent modified resin is the reaction product of a polyhydric alcohol, an organic acid and an amine.

GEORGE W. AYERS.
MARCELLUS J. GEERTS.
WILLIAM A. KREWER.

REFERENCES CITED

The following references are of record in the file of this patent:

UNITED STATES PATENTS

| Number | Name | Date |
|---|---|---|
| 1,884,495 | Zurcher | Oct. 25, 1932 |
| 2,190,776 | Ellingboe et al. | Feb. 20, 1940 |
| 2,304,637 | Hardy | Dec. 8, 1942 |
| 2,341,329 | Myers | Feb. 8, 1944 |
| 2,417,308 | Lee | Mar. 11, 1947 |